UNITED STATES PATENT OFFICE.

PATRICK M. BELTON, OF BROOKLYN, NEW YORK.

IMPROVEMENT IN COMPOUNDS USED AS DECOLORIZERS.

Specification forming part of Letters Patent No. 29,560, dated August 14, 1860.

*To all whom it may concern:*

Be it known that I, PATRICK M. BELTON, of Brooklyn, in the county of Kings and State of New York, have discovered a new and useful composition of matter as a substitute for animal charcoal in the manufacture of sugar, and for other analogous purposes or uses; and I do hereby declare that the following is such a full and clear description as that others will be enabled therefrom to make and use the same.

Sugar extracted from cane, beets, or other vegetable substances contains, prior to its refinement, certain organic coloring-matter which it is invariably desirable or essential to remove; also, during the process of refining sugar it is usual to add foreign substances that become incorporated with the sugar, such as lime, which is used during the clarification of the saccharine liquor, and other mineral salts. These likewise require to be removed, and to do so, and to remove the organic coloring-matter before referred to, animal charcoal has heretofore been most generally employed on account of its well-known affinity for both the said coloring-matter and the mineral salts. But the already extensive and daily increasing manufacture of sugar has, among other causes, rendered the price of "bone-black" or animal charcoal so expensive that it is now a matter of no small importance to find a substitute which, while its chemical action is the same, can be produced at less cost.

To effect this desideratum is one of the objects of my invention; and in order that the same may be fully understood I will now proceed to describe in detail my newly-discovered substitute for animal charcoal in the manufacture of sugar, its preparation, use, advantages, &c. Thus (to illustrate) I take peat, which is one essential ingredient in my composition, and, as it is dry from the bog, weigh it in divided lots or quantities, and to every one hundred pounds of said peat add, say, six and a quarter pounds (more or less) of chalk, (carbonate of lime,) or its equivalent, in a milky or sufficiently limpid state to reduce the mass to a pulpy state, and to effect a perfect admixture of the chalk and peat. A portion of the water is then pressed or otherwise extracted from the mass to give to the latter a more compact and firmer condition or consistency, when it may be cut or formed into flat cakes or pieces. These pieces are then generally covered with fine wire-gauze or cloth, and the several pieces thus covered piled one on top of the other, with a cast-iron or other suitable plate of sufficient size and strength between each piece or cake. The whole pile is then subjected to heavy pressure in a hydraulic or other powerful press, and as much of the moisture as possible thereby extracted from the mass, which is afterward taken from the press and allowed to dry, either by exposure to the air or by confining it in a stove or artificial drying-chamber of suitable character until the whole becomes perfectly dry. This mass of peat and chalk is then ground and sifted into a coarse mealy powder and subsequently charred and cooled, after which it is fit for use.

This substitute, as thus prepared, for bone-charcoal, I have found from actual experiment and use, has many advantages over the latter. For instance, it is or may be nearly two-thirds more in bulk, weight for weight, which materially reduces weight in the sugar-filters and the cost per pound of filling the same. It will decolor as much or more saccharine liquor than will nearly three times the weight of bone-charcoal, and it can be manufactured and sold for a much less price, amounting in some instances and districts to a reduction of more than sixty per cent., which, added to the great increase in bulk, shows a combined advantage of many hundred per cent. to the consumer.

Besides these, however, there are other points of gain by the use of this substitute for animal charcoal, some of which are of first consideration to the sugar-refiner. Thus much crystalline matter or sugar heretofore lost or allowed to remain in molasses by reason of the great expense of bone charcoal necessary in the process of its separation or refining, coupled with the repeated filterings also requisite, may by the cheapness of this substitute be economized and saved, and an immense gain in time be likewise effected by the repeated employment of fresh decoloring material in the place of allowing said material, as heretofore practiced, to remain long in the filters, and which, though quickly absorbent at first, becomes less so as the decoloring process progresses. The great expense of animal charcoal does not ordinarily allow of other than its most economical or longest use in the filters, even at the expense of time; but this objection is removed by the employment of my cheap substitute; and instead of allowing the saccharine liquor to remain in the filters at a high temperature for ten or fifteen hours in order to utilize all the decoloring properties of the charcoal it may by the use of this my substitute be profitably run through the filters with scarcely any intermission.

The value of my substitute is also evidenced in the sweetening of sour molasses, which does not ordinarily pay to employ animal charcoal to effect. Other advantages might be named, but it is superfluous here to do so, the importance of a cheap and efficient substitute for animal charcoal being well known to sugar-refiners and others.

I do not restrict my invention to the precise proportions of materials herein specified, nor yet to the exact mode I have described for preparing the composition; neither to the use of the two substances named free from admixture with other materials or substances, many of which may be added without injury to the composition; but

I claim—

The composition substantially as herein specified, by combining chalk or its equivalent with peat, so as to form, after carbonization, a mass which may be used as a substitute for animal charcoal in sugar-refining, essentially as herein set forth, and for other analogous purposes or uses.

In testimony whereof I have signed my name to this specification before two subscribing witnesses.

PATRICK M. BELTON.

Witnesses:
A. POLLOK,
S. H. MAYNARD.